US012552731B2

(12) United States Patent
Yu et al.

(10) Patent No.: US 12,552,731 B2
(45) Date of Patent: Feb. 17, 2026

(54) METHODS AND SYSTEMS FOR PRODUCING HIGH PURITY METHANOL FROM CARBON DIOXIDE HYDROGENATION USING NaA MEMBRANE REACTOR

(71) Applicant: RENSSELAER POLYTECHNIC INSTITUTE, Troy, NY (US)

(72) Inventors: Miao Yu, Pittsford, NY (US); Huazheng Li, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 954 days.

(21) Appl. No.: 17/424,234

(22) PCT Filed: Jan. 22, 2020

(86) PCT No.: PCT/US2020/014541
§ 371 (c)(1),
(2) Date: Jul. 20, 2021

(87) PCT Pub. No.: WO2020/154358
PCT Pub. Date: Jul. 30, 2020

(65) Prior Publication Data
US 2022/0112146 A1    Apr. 14, 2022

Related U.S. Application Data

(60) Provisional application No. 62/795,082, filed on Jan. 22, 2019.

(51) Int. Cl.
*B01J 19/24* (2006.01)
*B01J 21/04* (2006.01)
(Continued)

(52) U.S. Cl.
CPC .......... *C07C 29/60* (2013.01); *B01J 19/2475* (2013.01); *B01J 21/04* (2013.01); *B01J 23/72* (2013.01); *B01J 23/80* (2013.01); *B01J 29/7607* (2013.01); *B01J 37/0246* (2013.01); *B01J 2219/1943* (2013.01); *B01J 2229/64* (2013.01)

(58) Field of Classification Search
CPC . B01J 20/3238; B01J 37/0246; B01J 19/2475
See application file for complete search history.

(56) References Cited

U.S. PATENT DOCUMENTS 7,604,746 B2   10/2009 Childs et al.
8,196,755 B2    6/2012 Diefenbacher et al.
(Continued)

FOREIGN PATENT DOCUMENTS

CN   101721920   *  6/2010
EP   2974785 A1      1/2016
EP   3205387 A1      8/2017

OTHER PUBLICATIONS

Gallucci. An experimental study of CO2 hydrogenation into methanol involving a zeolite membrane reactor. Chemical Enginerring and Processing 43 (2004) p. 1029-1036 (Year: 2004).*

(Continued)

*Primary Examiner* — Matthew E. Hoban
(74) *Attorney, Agent, or Firm* — Barclay Damon LLP; Anthony P. Gangemi

(57) ABSTRACT

The dehydration membrane reactor for methanol production from $CO_2$ hydrogenation includes one or more porous supports, a dehydration membrane on the one or more porous supports, and a catalyst layer on the dehydration membrane. The one or more porous supports include hollow ceramic fibers and the dehydration membrane includes NaA zeolite. The reactor is made by dip-coating the porous supports in a zeolite crystal seed solution and drying the coated porous support. The coated porous support is dried at about 80° C.

(Continued)

and then heated to a temperature above about 200° C. The NaA zeolite membrane is then grown on the seeded support, and a catalyst layer is applied to the zeolite membrane. A feedstream including carbon dioxide and hydrogen is fed to the catalyst layer, where a product stream including methanol and water is evolved. The water is then removed from the product stream through the dehydration membrane to produce a high-purity methanol product.

7 Claims, 4 Drawing Sheets

(51) Int. Cl.
*B01J 23/72* (2006.01)
*B01J 23/80* (2006.01)
*B01J 29/76* (2006.01)
*B01J 37/02* (2006.01)
*C07C 29/60* (2006.01)

(56) References Cited

U.S. PATENT DOCUMENTS

| | | |
|---|---|---|
| 8,669,200 B2 | 3/2014 | Perera et al. |
| 9,133,074 B2 | 9/2015 | Jennings |
| 9,149,769 B2 | 10/2015 | Seiki et al. |
| 9,333,457 B2 | 5/2016 | Sawamura et al. |
| 9,561,477 B2 | 2/2017 | Dutta et al. |
| 2007/0254969 A1 | 11/2007 | Olah et al. |
| 2010/0071559 A1 | 3/2010 | Miachon et al. |
| 2010/0304953 A1 | 12/2010 | Liu et al. |
| 2012/0009120 A1 | 1/2012 | Cho et al. |
| 2015/0008180 A1 | 1/2015 | Uchikawa et al. |
| 2015/0101985 A1 | 4/2015 | Yeo et al. |
| 2015/0265975 A1 | 9/2015 | Liu et al. |
| 2016/0214064 A1* | 7/2016 | Gu .................... B01D 67/0051 |
| 2018/0362426 A1 | 12/2018 | Chen et al. |

OTHER PUBLICATIONS

International Search Report and the Written Opinion of the International Searching Authority, International Application No. PCT/US2020/014541, mailed May 28, 2020.

Gallucci, F., et al., "An experimental study of CO2 hydrogenation into methanol involving a zeolite membrane reactor," Chemical Engineering and Processing, vol. 43, pp. 1029-1036, 2004.

Tran, Tri Van, Le-Phuc, Nguyen, Nguyen, Thu Hoai, Dang, Tung Thanh, Ngo, Phuong Thuy and Nguyen, Duc Anh. "Application of NaA Membrane Reactor for Methanol Synthesis in CO2 Hydrogenation at Low Pressure" International Journal of Chemical Reactor Engineering, vol. 16, No. 4, 2018, pp. 20170046.

* cited by examiner

METHODS AND SYSTEMS FOR PRODUCING HIGH PURITY METHANOL FROM CARBON DIOXIDE HYDROGENATION USING NaA MEMBRANE REACTOR

CROSS REFERENCE TO RELATED APPLICATION(S)

This application is a national stage filing of International Patent Application No. PCT/US2020/014541, filed Jan. 22, 2020, which claims the benefit of U.S. Provisional Application No. 62/795,082, filed Jan. 22, 2019, which is incorporated by reference as if disclosed herein in its entirety.

STATEMENT REGARDING FEDERALLY SPONSORED RESEARCH OR DEVELOPMENT

This invention was made with government support under grant no. DE-AR0000806 and DE-AR0000931, awarded by the Department of Energy. The government has certain rights in the invention.

BACKGROUND

As one of the consequences of rapid economic and population growth, the global energy consumption, as well as $CO_2$ emission from energy use, approaches a new high, imposing huge detrimental effects on our environment. Effective utilization of $CO_2$ may serve as a crucial component in Carbon Capture and Storage (CCS) program that regulates the net $CO_2$ emission to the atmosphere through technologies related to $CO_2$ capture, storage and utilization. $CO_2$ utilization to chemicals and fuels have been paid more and more attention both from academia and industry because it can convert waste $CO_2$ to value added chemicals. Among various $CO_2$ utilization technologies, catalytic $CO_2$ conversion for production of fuels and chemicals is a very attractive approach to recycle the captured $CO_2$, leading to a carbon-neutral energy cycle.

Specifically, catalytic $CO_2$ hydrogenation has been intensively investigated for decades, and recently commercial plants have also been established. This process, however, suffers severely from low $CO_2$ conversion, limited by thermodynamic equilibrium. Theoretically, to increase $CO_2$ conversion and hydrogenation rates, high pressure and elevated temperature are applied; for example, $CO_2$ conversion can be promoted from 22% at 210° C. and 76 bar to 37% at 260° C. and 360 bar with a feed $H_2/CO_2$ ratio of 3. This, as a result, not only increases energy input and lowers process efficiency, but also imposes higher investment on equipment and management dealing with such harsh conditions. In addition, water, as the major byproduct, deactivates the catalysts and inhibits the kinetics of this process.

Catalytic $CO_2$ conversion to fuels/chemicals, such as methanol, has been regarded as an effective route to achieve carbon-neutral energy cycle that may address energy crisis and environmental concerns simultaneously. Current application of this technology in industry is challenging and less attractive, however, primarily due to its low efficiency (low $CO_2$ conversion and product yield). The $CO_2$ emission from burning fossil fuels have reached 33.4 gigatons in 2017, and the methanol market is expected to witness high growth owing to its widespread applications in various industries. For example, the methanol for fuel use in 2016 in China was 193 million barrels, and total methanol consumption is expected to increase by 12% annually, reaching 713 million barrels (97 million tons) in 2022.

Membrane reactors, integrating selective membranes for component addition or removal from reactor with catalysts in one unit, may serve as a method to overcome the reaction equilibrium and increase the conversion of key reactants while still maintaining the moderate reaction conditions. For methanol production from catalytic $CO_2$ hydrogenation, water is the major by-product that severely restricts $CO_2$ conversion and inhibits reaction rate. A dehydration membrane that can selectively remove water in-situ from the reaction system, therefore, is expected to greatly promote methanol production from catalytic $CO_2$ hydrogenation. Few experimental studies have investigated the effects of membranes on the $CO_2$ conversion, product selectivity and yields. Considering the harsh reaction conditions (>20 bar and >200° C.), it is very challenging to develop/identify such a highly efficient dehydration membrane for in-situ water removal.

NaA membranes, due to their highly stable and hydrophilic property, have been well investigated for decades. NaA zeolite membranes, with their excellent hydrothermally stable and intrinsically hydrophilic microporous structure, separate themselves from various zeolite membranes for excellent water removal capability, and thus might be a promising candidate for dehydration in the high temperature and high pressure reactor. NaA zeolite membranes have been produced in large scale, which might greatly accelerate their large-scale application in dehydration membrane reactor once potential were demonstrated. However, performance of currently NaA zeolite membranes for dehydration at high temperature and high pressure is still low.

SUMMARY

Accordingly, the present disclosure relates to a dehydration membrane reactor for methanol production from $CO_2$ hydrogenation, including one or more porous supports, a dehydration membrane on the one or more porous supports, and a catalyst layer on the dehydration membrane, wherein in the one or more porous supports includes a lumen. In some embodiments, the one or more porous supports include a tubular sidewall having an external surface and an internal surface, wherein the dehydration membrane is disposed on the exterior surface and the interior surface encloses the lumen. In some embodiments, the one or more porous supports include hollow ceramic fibers. In some embodiments, the dehydration membrane includes NaA zeolite. In some embodiments, the catalyst layer includes copper, zinc oxide, and alumina. In some embodiments, the reactor includes a feedstream in communication with the catalyst layer, the feedstream including $H_2$ and $CO_2$, wherein the molar ratio of $H_2$ to $CO_2$ is about 3:1. In some embodiments, the dehydration membrane reactor is produced by a method including providing the porous support, applying a plurality of NaA zeolite crystal seeds to the porous support to form a seeded support, heating the seeded support at a temperature above about 200° C., growing an NaA zeolite membrane on the seeded support, and applying a catalyst layer to the zeolite membrane.

Some embodiments of the present disclosure relate to a method of making a membrane reactor for methanol production from $CO_2$ hydrogenation including providing a porous support, applying a plurality of zeolite crystal seeds to the porous support to form a seeded support, heating the seeded support at a temperature above about 150° C., growing a zeolite membrane on the seeded support, and applying a catalyst layer to the zeolite membrane. In some embodiments, applying a plurality of zeolite crystal seeds to the porous support to form a seeded support includes dip-coating the porous support in a zeolite crystal seed solution and drying the coated porous support. In some embodiments, the coated porous support is dried at a temperature below about 80° C. In some embodiments, the porous support with the zeolite crystal seeds is heated above about 200° C. In some embodiments, the one or more porous supports include ceramic fibers. In some embodiments, the zeolite membrane includes NaA zeolite. In some embodiments, the zeolite crystal seeds are sized between about 20-250 nm.

Some embodiments of the present disclosure relate to a method for producing methanol including providing a dehydration membrane reactor, the dehydration membrane reactor including one or more porous supports, a dehydration membrane on the one or more hollow porous supports, and a catalyst layer on the dehydration membrane, wherein the one or more porous supports includes a lumen, supplying a feedstream including carbon dioxide to the catalyst layer, evolving a product stream from the feedstream, the product stream including methanol and water, and transporting water from the product stream through the dehydration membrane to the lumen. In some embodiments, the porous supports include hollow ceramic fibers. In some embodiments, the zeolite membrane includes NaA zeolite. In some embodiments, the catalyst layer includes copper, zinc oxide, and alumina. In some embodiments, the feed stream includes $H_2$ and $CO_2$, wherein the molar ratio of $H_2$ to $CO_2$ is about 3:1. In some embodiments, evolving a product stream from the feedstream occurs above about 20 bar and 200° C.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
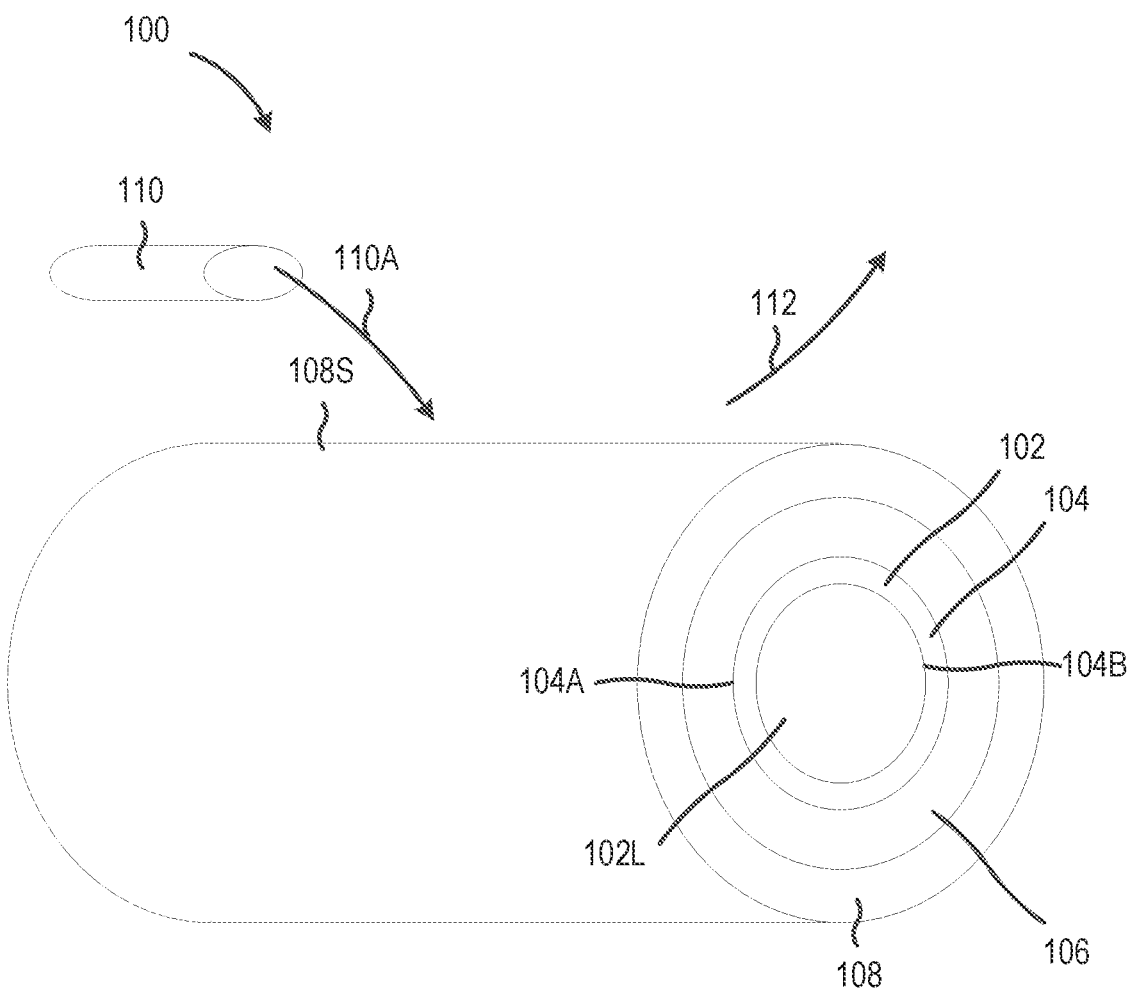
FIG. 1 is a schematic representation of a membrane reactor according to some embodiments of the present disclosure.

Referring now to FIG. 1, some embodiments of the present disclosure are directed to a membrane reactor 100. In some embodiments, membrane reactor 100 is configured to remove an unwanted component from a feedstream. In some embodiments, reactor 100 is configured to facilitate a reaction that generates a desired product, and also facilitate removal of unwanted components evolved during the reaction. In some embodiments, the reaction is a Fischer-Tropsch or other synthesis reaction or series of reactions. In some embodiments, the desired products are evolved and undated components removed by reactor 100 substantially simultaneously. In some embodiments, the desired product is methanol. In some embodiments, the methanol is formed via reactor 100 from a $CO_2$ hydrogenation reaction, as will be discussed in greater detail below.

In some embodiments, reactor 100 includes one or more supports 102. In some embodiments, at least one of supports 102 is porous. In some embodiments, porous supports 102 includes a plurality of pores and/or internal channels sized to accommodate one or more nanocrystals, e.g., having a particle size between about 50 nm and about 250 nm, as will be discussed in greater detail below. In some embodiments, the size of the pores/internal channels is between about 100 nm and about 500 nm. In some embodiments, the size of the pores/internal channels is about 400 nm. In some embodiments, supports 102 can be any suitable shape. In some embodiments, supports 102 are generally tubular in shape. In some embodiments, supports 102 include a lumen 102L. In some embodiments, the one or more porous supports include a tubular sidewall 104. In some embodiments, tubular sidewall 104 has an external surface 104A and an internal surface 104B. In some embodiments, internal surface 104B encloses lumen 102L.

In some embodiments, supports 102 are composed of any suitable material capable of withstanding elevated temperatures, e.g., temperatures greater than about 100° C. In some embodiments, supports 102 include a ceramic. In some embodiments, supports 102 are ceramic fibers. In some embodiments, the ceramic fibers are hollow.

In some embodiments, reactor 100 includes a separation membrane 106. In some embodiments, membrane 106 is selective for the unwanted components evolved within reactor 100, facilitating separation of the unwanted component from the desired product. In some embodiments, membrane 106 is a dehydration membrane. As used herein, a dehydration membrane, e.g., membrane 106, is configured to selectively remove water from the environment surrounding the membrane. In some embodiments, membrane 106 is disposed on exterior surface 104A. In some embodiments, membrane 106 includes a zeolite. In some embodiments, the zeolite is zeolite A, zeolite X, zeolite Y, or combinations thereof. In some embodiments, the zeolites include one or more cations. In some embodiments, the cations include $Na^+$. In some embodiments, membrane 106 includes NaA zeolite.

In some embodiments, reactor 100 includes a catalyst layer 108. In some embodiments, the catalyst layer is disposed on membrane 106. In some embodiments, catalyst layer 108 is configured, e.g., includes catalysts effective to at least in part catalyze a reaction that generates the desired product of reactor 100, e.g., methanol. In some embodiments, catalyst layer 108 includes copper, zinc oxide, and alumina. In some embodiments, catalyst layer 108 includes $Cu/ZnO/Al_2O_3$.

Without wishing to be bound by theory, the zeolite membranes of the present disclosure have a hydrophilic, microporous structure, making them excellent at removing water from the environment surrounding the membrane. In some embodiments, the membranes dehydrate the environment to treat a feedstream or product stream, e.g., a stream including syngas, natural gas, supercritical $CO_2$, etc., as will be discussed in greater detail below. For methanol production from catalytic $CO_2$ hydrogenation, water is a major by-product that restricts $CO_2$ conversion and inhibits reaction rate. Some embodiments of the present disclosure remove water in-situ, thus shifting the equilibrium towards methanol formation and leading to higher $CO_2$ conversion and methanol yield.

In some embodiments, reactor 100 includes one or more feedstream inlets 110. In some embodiments, reactor 100 includes one or more feedstreams 110A in communication with feedstream inlets 110 and a surface 108S of catalyst layer 108. In some embodiments, feedstreams 110A include reactants whose reaction results in the desired product, e.g., methanol. In some embodiments, feedstream 110A includes $CO_2$-rich syngas, $CO_2$-free syngas, CO-rich syngas, natural gas, supercritical $CO_2$, or combinations thereof. In some embodiments, feedstream 110A includes at least $H_2$ and $CO_2$, wherein the molar ratio of $H_2$ to $CO_2$ is about 3:1. In some embodiments, reactor 100 includes one or more product streams 112 that include the desired products evolved in the reactor. In some embodiments, reactor 100 is a packed bed reactor.

Figure 2A:
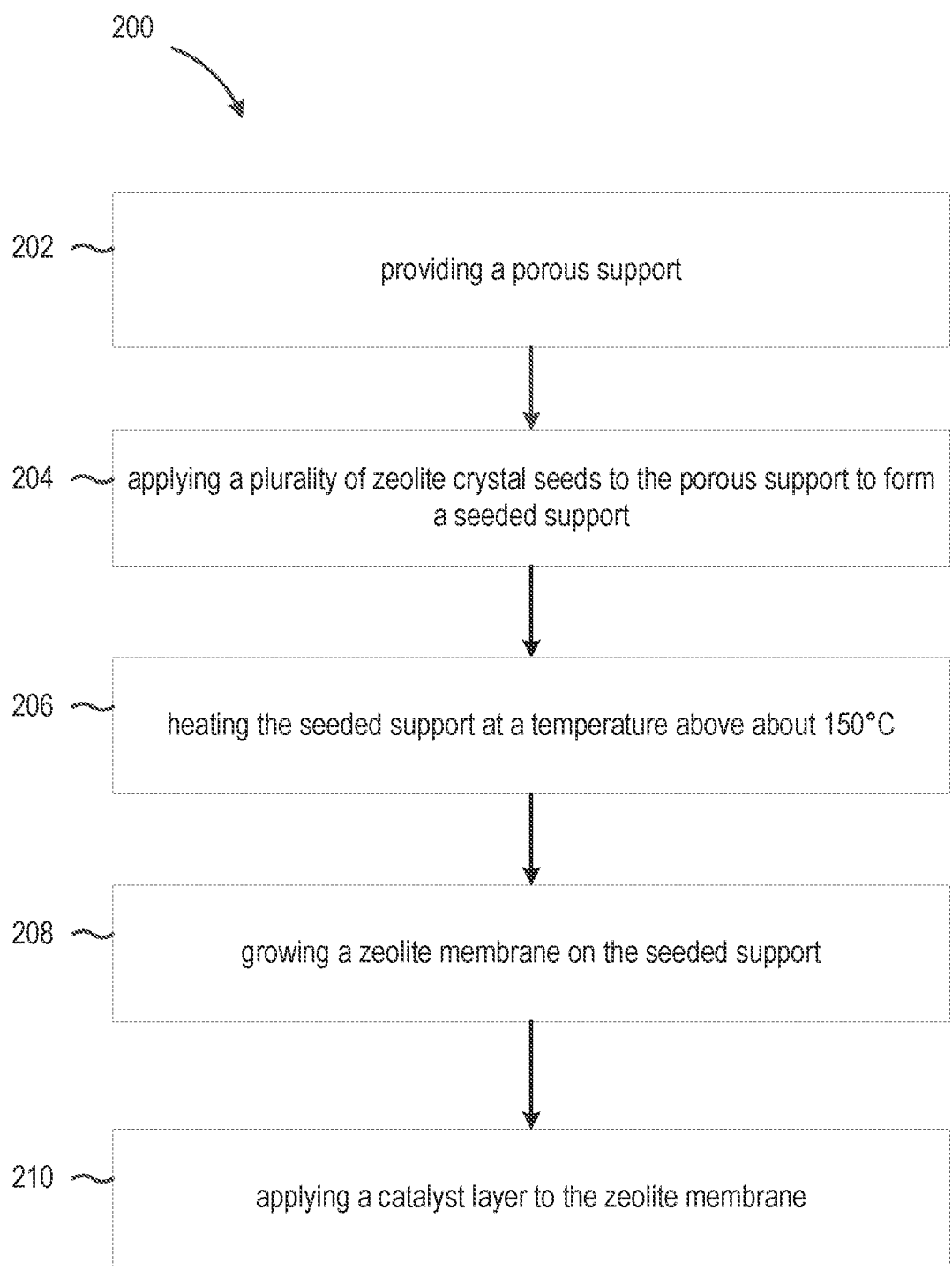
FIG. 2A is a chart of a method of making a membrane reactor according to some embodiments of the present disclosure.
Figure 2B:
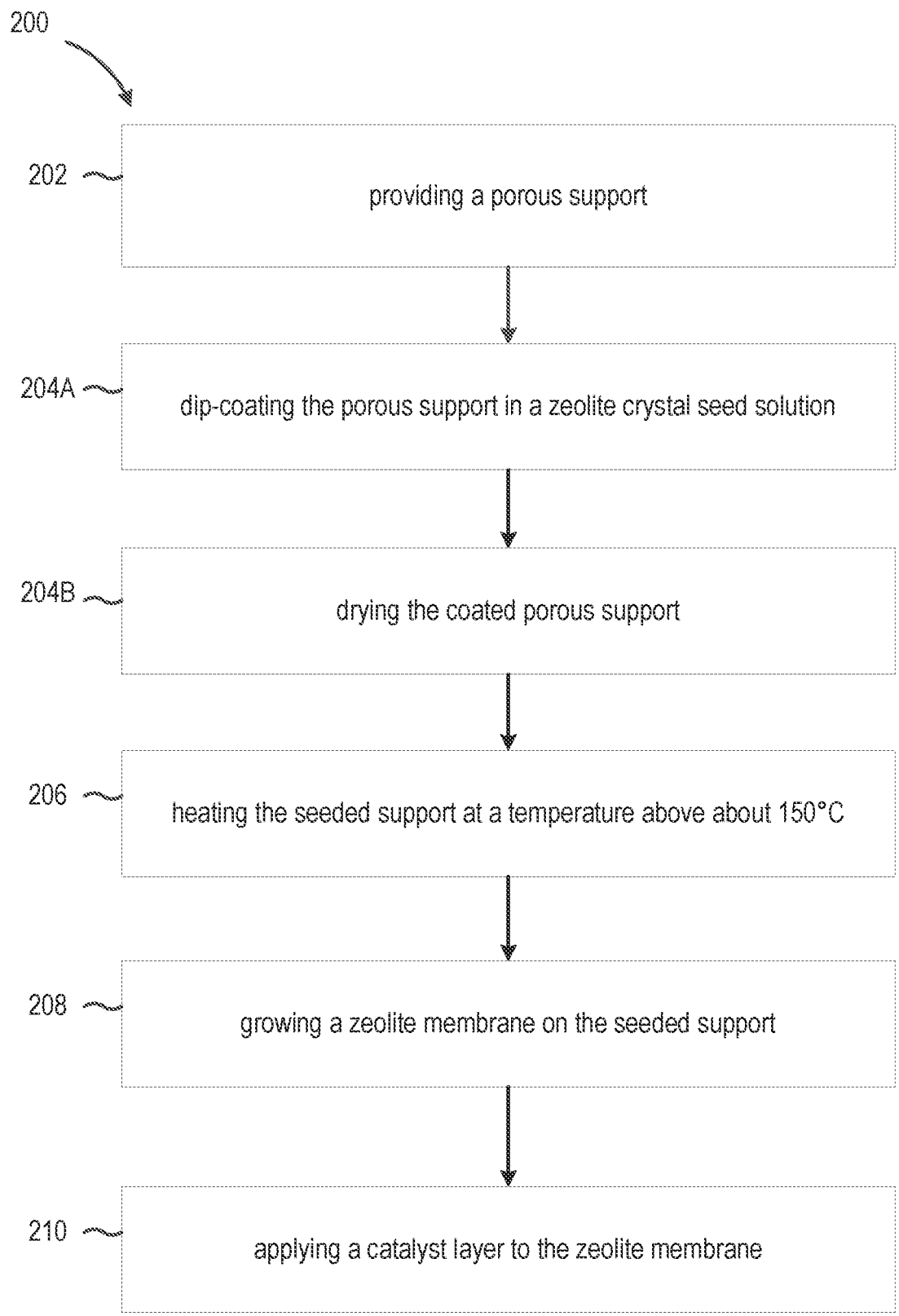
FIG. 2B is a chart of a method of making a membrane reactor according to some embodiments of the present disclosure.

Referring now to FIGS. 2A-2B, some embodiments of the present disclosure are directed to a method 200 of making a membrane reactor for the generation of a desired product, e.g., for methanol production from $CO_2$ hydrogenation as discussed above. At 202, one or more porous supports are provided. As discussed above, in some embodiments, the porous supports include a plurality of pores and/or internal channels sized to accommodate one or more nanocrystals. In some embodiments, the porous support is generally tubular in shape. In some embodiments, the porous support includes a lumen. In some embodiments, the porous support is composed of any suitable material capable of withstanding elevated temperatures, e.g., temperatures greater than about 100° C. In some embodiments, the porous support includes a ceramic. In some embodiments, the porous support includes ceramic fibers. In some embodiments, the ceramic fibers are hollow.

At 204, a plurality of nanocrystals are applied to the porous support to form a seeded support. As discussed above, in some embodiments, the nanocrystals have a particle size between about 50 nm and about 250 nm. In some embodiments, the nanocrystals have a particle size at least smaller than a pore size of the porous support. Thus, when applied to the porous support, the nanocrystals penetrate into the porous support to attach within as well to the surface of that support. In some embodiments, the nanocrystals are zeolite crystal seeds, e.g., NaA zeolite crystal seeds, as will be discussed in greater detail below. Referring specifically to FIG. 2B, in some embodiments, at 204A, the nanocrystals are applied to the porous support by dip-coating the support in a solution including the nanocrystals, e.g., zeolite crystal seeds. At 204B, the dip-coated support is then dried. In some embodiments, the dip-coated support is dried at a temperature below about 100° C. In some embodiments, the dip-coated support is dried at a temperature below about 80° C.

Referring again to FIGS. 2A-2B, at 206, the seeded support is heated at an elevated temperature. In some embodiments, the seeded support is heated to about 150° C. In some embodiments, the seeded support is heated above about 150° C. In some embodiments, the seeded support is heated to about 200° C. In some embodiments, the seeded support is heated to above about 200° C. At 208, a membrane, e.g., NaA zeolite membrane, is grown on the seeded support. Without wishing to be bound by theory, heating 206 increases the binding strength between the nanocrystals and the porous support. Growth of the membrane takes place both in the pores and on the surface of the support, creating a consistent and dense layer of membrane interfacing closely with the support with reduced boundary defects. Reducing the boundary defects improves the selectivity of the membranes, and further allows them to maintain that selectivity even at challenging industrial conditions.

At 210, a catalyst layer is applied to the membrane. As discussed above, in some embodiments, the catalyst layer includes copper, zinc oxide, and alumina. In some embodiments, the catalyst layer includes $Cu/ZnO/Al_2O_3$.

In some embodiments of the present disclosure, nano-sized zeolite seeds were hydrothermally synthesized. In an exemplary embodiment, NaA zeolite seeds with molar composition of 1.8 $Al_2O_3$: 11.25 $SiO_2$: 0.6 $Na_2O$: 13.4 (TMA) 2O: 700 $H_2O$ were synthesized according to the following procedure:

(1) 0.1361 g of sodium hydroxide (NaOH, 98 wt. %, Sigma-Aldrich), 13.8912 g of tetramethylammonium hydroxide pentahydrate (TMAOH.5$H_2O$, 97 wt. %, Sigma), 6.7 g of deionized (DI) water were mixed with vigorous agitation; after the solution was clear, 2.0816 g of aluminum isopropoxide (Al(i-$C_3H_7$O)3, 98 wt. %, Sigma-Aldrich) was added into the resultant solution, and stirred for 12 h at room temperature;

(2) 4.6875 g of Ludox colloidal silica (40 wt. % in water, Sigma-Aldrich) was added into the solution dropwise until the solution became clear;

(3) The resultant solution was transferred to an autoclave, sealed and then the autoclave was put into the oven that had been preheated to 100° C. After 3 h of hydrothermal synthesis, crystals were collected by repeated centrifugation at 10,000 rpm for 0.5 h and rinsing with DI water until the solution pH reached 9, and then were dried at 100° C. overnight.

Figure 3:
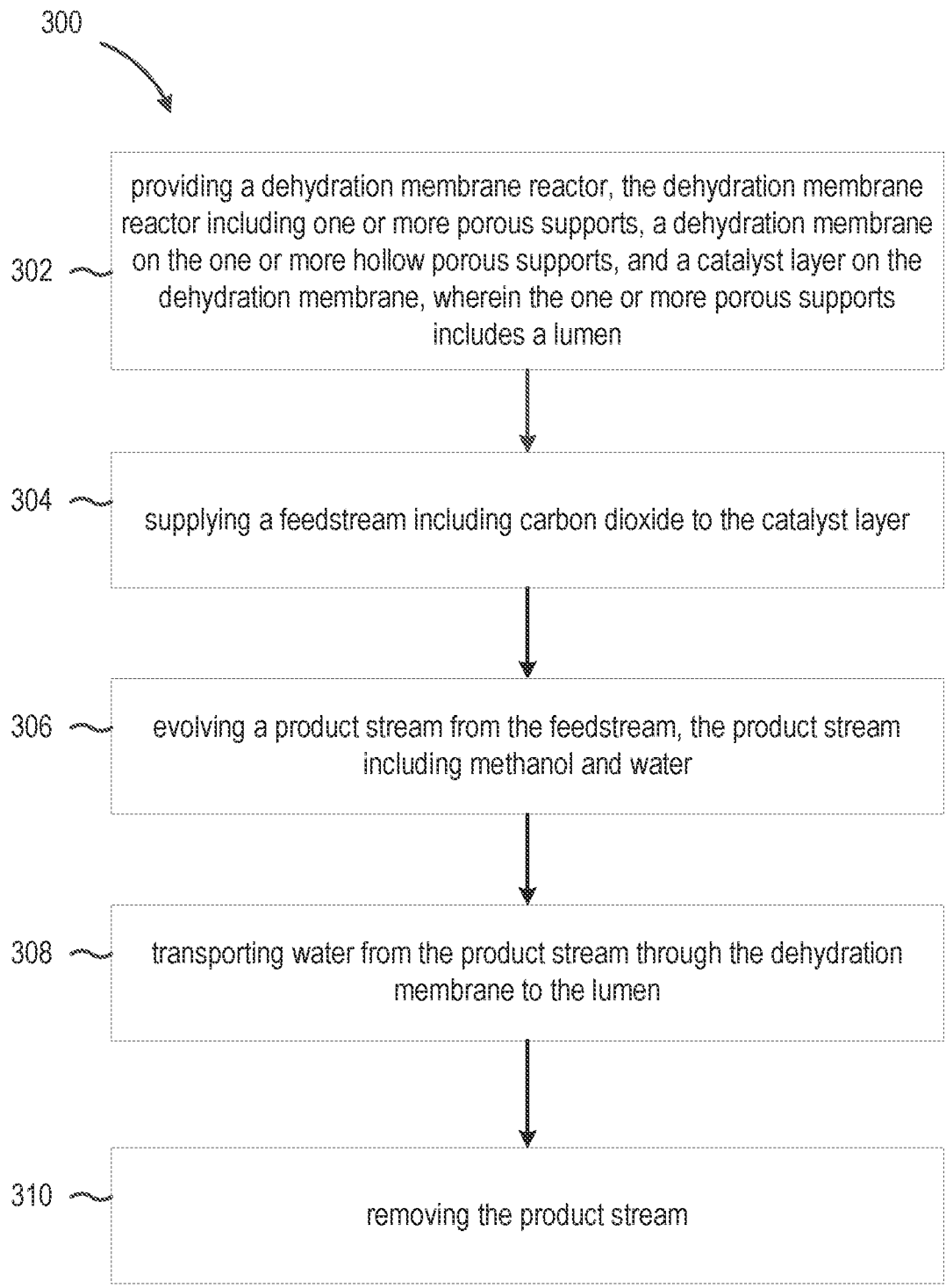
FIG. 3 is a chart of a method of producing methanol according to some embodiments of the present disclosure.

Referring now to FIG. 3, some embodiments of the present disclosure are directed to using the membrane reactors described above to generate one or more desired products, e.g., methanol. At 302, a membrane reactor, e.g., a dehydration membrane reactor, is provided. As discussed above, in some embodiments, the dehydration membrane reactor includes one or more porous supports, a dehydration membrane on the one or more hollow porous supports, and a catalyst layer on the dehydration membrane, and the one or more porous supports includes a lumen. At 304, one or more feedstreams including one or more reactants were supplied to the catalyst layer. In some embodiments, the feedstreams include carbon dioxide. At 306, a product stream is evolved from the feedstreams, having been generated via a reaction catalyzed by the catalyst layer. In some embodiments, the temperature and pressure within the reactor are maintained at desired levels to facilitate reactions and generation of desired products within. In some embodiments, the temperature inside the reactor is brought to above about 200° C. In some embodiments, the temperature inside the reactor is brought to above about 250° C. In some embodiments, the pressure inside the reactor is brought to above about 20 bar. In some embodiments, the pressure inside the reactor is brought to above about 30 bar. In some embodiments, the pressure inside the reactor is brought to above about 40 bar. In some embodiments, the pressure inside the reactor is brought to above about 50 bar. In some embodiments, the product stream includes a desired product and an unwanted component. At 308, one or more unwanted components are removed from the product stream. In some embodiments, an unwanted component is transported from the product stream through the membrane to the lumen of the porous support, facilitating separation of the unwanted component from the desired product. At 310, in some embodiments, the product stream is then removed.

In an exemplary embodiment, a packed-bed reactor including a plurality of hollow ceramic fibers is provided. The hollow ceramic fibers include NaA zeolite membranes disposed on an external surface thereof and enclose a lumen. A $Cu/ZnO/Al_2O_3$ catalyst layer is disposed on the NaA zeolite membranes. Feedstreams including $H_2$ and $CO_2$ are fed to the catalyst layer at a molar ration $H_2$ to $CO_2$ of about 3:1. Pressure and temperature within the reactor were brought to above about 200° C. and 20 bar. A product stream including methanol and water is generated according to the following reactions 1-3:

$$CO_2 + 3H_2 \leftrightarrow CH_3OH + H_2O \quad \Delta H_{298\,K} = -49.5 \text{ kJ/mol} \quad (1)$$

$$CO_2 + H_2 \leftrightarrow CO + H_2O \quad \Delta H_{298\,K} = 41 \text{ kJ per mol} \quad (2)$$

$$CO + 2H_2 \leftrightarrow CH_3OH \quad \Delta H_{298\,K} = -90.5 \text{ kJ per mol} \quad (3)$$

The water was transported from the product stream through the dehydration membrane to the lumen, resulting in a stream of high purity methanol.

Methods and systems of the present disclosure include improved NaA membranes with high separation performance for water/gas mixtures at high pressures and elevated temperatures, that are themselves advantageously produced by an improved seeding method. Incorporation of synthesized NaA membranes into a dehydration membrane reactor for methanol production from $CO_2$ hydrogenation significantly enhanced $CO_2$ conversion and methanol yield, approximately 3 times of that of PBR without these membranes. Catalyst deactivation was also greatly alleviated by in-situ water removal from the reactor. This technique is scalable and can be applied to other reactions with water as the by-product and that are thermodynamically limited.

Systems and methods of the present disclosure save a large amount of energy for product purification and make this process more economically feasible. The method of making the membrane is a simple but effective seeding method which shows high $H_2O$/gas selectivity at high temperature and high pressure (for example, $H_2O/CO_2$ selectivity as high as ~10,000 at 250° C. and 38 bar). The $H_2O$/gas selectivity of NaA membrane prepared by this seeding method is 2 orders of magnitude higher than that of NaA membrane prepared by regular seeding method without heating the seeded support at high temperature before membrane synthesis.

Besides the above advantages, high purity methanol (~95 wt. %), much higher than that of obtained in current industrial process (~68 wt. %), can be directly produced by simply cooling down the product stream after the reactor. This saves a considerable amount of energy for methanol purification. These NaA membrane reactors make this process more economically feasible, and largely accelerate the industrial methanol production from $CO_2$ hydrogenation. Long-term stability testing shows continuous production of high purity methanol can be achieved due to stability of the membrane.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of making a membrane reactor for methanol production from $CO_2$ hydrogenation comprising:
   providing a porous support;
   applying a plurality of zeolite crystal seeds to the porous support to form a seeded support;
   heating the seeded support at a temperature above about 150° C.;
   growing a zeolite membrane on the seeded support; and
   applying a catalyst layer to an outer surface of the zeolite membrane.

2. The method according to claim 1, wherein applying a plurality of zeolite crystal seeds to the porous support to form a seeded support further comprises:
   dip-coating the porous support in a zeolite crystal seed solution; and
   drying the coated porous support.

3. The method according to claim 1, wherein the coated porous support is dried at a temperature below about 80° C.

4. The method according to claim 1, wherein the porous support with the zeolite crystal seeds is heated above about 200° C.

5. The method according to claim 1, wherein the one or more porous supports include ceramic fibers.

6. The method according to claim 1, wherein the zeolite membrane includes NaA zeolite.

7. The method according to claim 6, wherein the zeolite crystal seeds are sized between about 20-250 nm.

* * * * *